United States Patent
Alm et al.

(10) Patent No.: US 10,084,972 B2
(45) Date of Patent: Sep. 25, 2018

(54) MONITORING METHODS AND DEVICES

(71) Applicant: Axis AB, Lund (SE)

(72) Inventors: Carl-Axel Alm, Lund (SE); Stefan Lundberg, Lund (SE); Johan Wennersten, Lund (SE)

(73) Assignee: Axis AB, Lund (SE)

( * ) Notice: Subject to any disclaimer, the term of this patent is extended or adjusted under 35 U.S.C. 154(b) by 248 days.

(21) Appl. No.: 14/887,949

(22) Filed: Oct. 20, 2015

(65) Prior Publication Data

US 2016/0119553 A1 Apr. 28, 2016

(30) Foreign Application Priority Data

Oct. 27, 2014 (EP) .................................... 14190460

(51) Int. Cl.
*H04N 5/272* (2006.01)
*H04N 7/18* (2006.01)
(Continued)

(52) U.S. Cl.
CPC ......... *H04N 5/272* (2013.01); *G06K 9/00771* (2013.01); *G06K 9/3241* (2013.01); *G06T 7/20* (2013.01); *G08B 13/19667* (2013.01); *G08B 13/19691* (2013.01); *H04N 7/183* (2013.01); *H04N 7/188* (2013.01); *G06T 2207/10016* (2013.01); *G08B 13/19682* (2013.01); *G08B 13/19697* (2013.01)

(58) Field of Classification Search
CPC ........ H04N 5/272; H04N 7/183; H04N 7/188; G06K 9/3241; G06K 9/00771; G06T 7/20; G06T 2207/10016

USPC .......................................... 348/143; 382/103
See application file for complete search history.

(56) References Cited

U.S. PATENT DOCUMENTS

2001/0054647 A1* 12/2001 Keronen ............. G06F 3/04886
235/492
2003/0086496 A1* 5/2003 Zhang ................ G06K 9/00711
375/240.16
(Continued)

FOREIGN PATENT DOCUMENTS

CN 1961342 A 5/2007
CN 101517431 A 8/2009
(Continued)

OTHER PUBLICATIONS

European Search Report with written opinion dated May 7, 2015 in European Application 14190460.7, filed on Oct. 27, 2014.
(Continued)

*Primary Examiner* — Hee-Yong Kim
(74) *Attorney, Agent, or Firm* — Oblon, McClelland, Maier & Neustadt, L.L.P.

(57) ABSTRACT

The present application relates to methods and systems for including sensor data from a sensor unit (108) as an overlay (204) in a video stream from a camera (106) monitoring a scene (200). The overlay has overlay regions (206a-f) corresponding to scene regions (202a-f), and when the sensor unit detects motion in a scene region a graphical element (208) is added to the overlay in the overlay region corresponding to that scene region. Video analytics procedures, such as object feature detection or motion or change detection may then be used to determine if detection has been made in a specific scene region by both the camera and the sensor unit.

10 Claims, 4 Drawing Sheets

(51) Int. Cl.
*G06K 9/00* (2006.01)
*G06K 9/32* (2006.01)
*H04N 7/12* (2006.01)
*H04N 5/91* (2006.01)
*G06T 7/20* (2017.01)
*G08B 13/196* (2006.01)

(56) References Cited

U.S. PATENT DOCUMENTS

| | | |
|---|---|---|
| 2005/0259149 A1 | 11/2005 | Smaragdis et al. |
| 2007/0237492 A1* | 10/2007 | Roberts .................. H04N 21/40 386/248 |
| 2008/0050092 A1 | 2/2008 | Erickson |
| 2009/0225164 A1 | 9/2009 | Renkis |
| 2009/0237508 A1 | 9/2009 | Arpa et al. |
| 2010/0020166 A1 | 1/2010 | Levine et al. |
| 2010/0103020 A1* | 4/2010 | Wu ..................... G01S 13/4454 342/28 |
| 2012/0106782 A1 | 5/2012 | Nathan et al. |

FOREIGN PATENT DOCUMENTS

| | | |
|---|---|---|
| CN | 103448634 A | 12/2013 |
| EP | 1 875 449 B1 | 6/2009 |
| JP | 11-91467 A | 4/1999 |
| JP | 2009-227450 A | 10/2009 |
| JP | 2010-182021 A | 8/2010 |
| WO | WO 2005/114605 A1 | 12/2005 |

OTHER PUBLICATIONS

Yucong Lu, et al., "Multisensor System for Safer Human-Robot Interaction", Proceedings of the 2005 IEEE International Conference on Robotics and Automation, 2005, 6 pgs.

Office Action dated Sep. 19, 2017 in Japanese Patent Application No. 2015-206938 (with English translation).

* cited by examiner

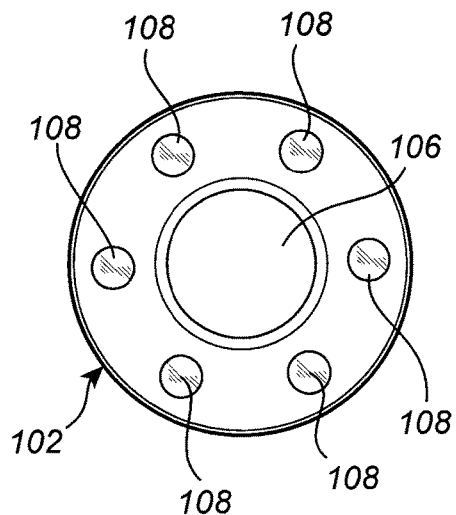
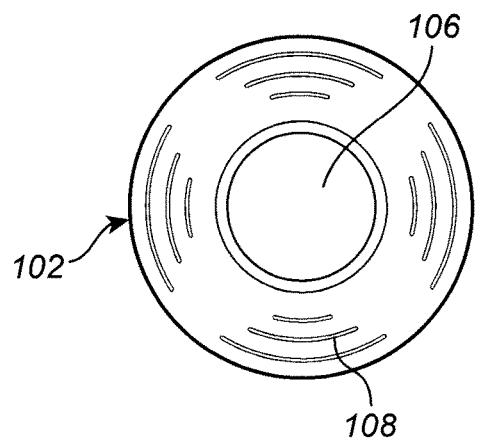
Fig. 6　　　　Fig. 7
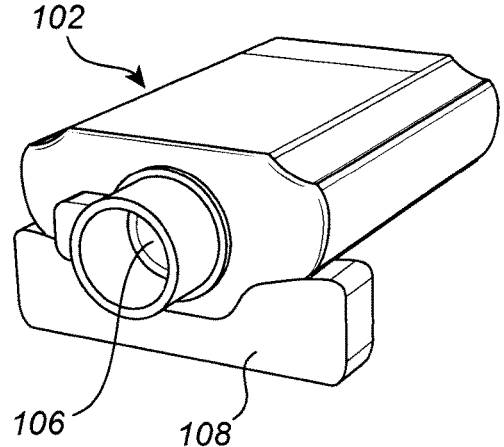
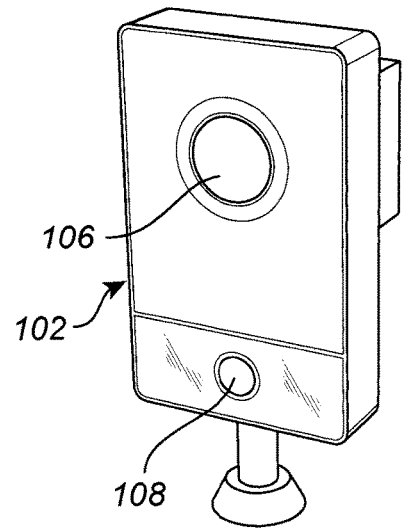
Fig. 8　　　　Fig. 9

MONITORING METHODS AND DEVICES

TECHNICAL FIELD

The present invention relates to methods and devices for monitoring a scene.

BACKGROUND

Monitoring cameras are used in many different applications, both indoors and outdoors. The video captured by such cameras is often sent to a video management system, VMS, which may apply various video analytics procedures to the video, such as motion detection and object detection or recognition, where the objects e.g. could be faces or license plates. The outcome of the analytics procedures may be logged as events which in turn may trigger alarms or is collected into different statistics, such as for the purpose of people counting or vehicle counting. The VMS may also be arranged to start a recording of the video if certain events take place. In some cases the monitoring cameras themselves may also have the capacity to analyze the captured video and locally perform various video analytics procedures.

There also exist different types of motion sensors, such as passive infrared, PIR, sensors, which sense changes in heat radiation. Both video analytics procedures performed on video from a monitoring camera and motion detection by motion sensors may sometimes trigger on uninteresting objects or motions in a monitored scene. Different efforts exist to combine the output from cameras and other types of sensors. As one example a PIR sensor may be connected to the I/O port of a monitoring camera, and when the PIR sensor is triggered, the camera is set to start recording. Other ideas on how to combine outputs from a camera with other sensors also exist, but there is still room for improvement in this area.

SUMMARY OF THE INVENTION

In view of the above, it is thus an object of the present invention to provide a convenient way of combining information from a monitoring camera and an external sensor, such as a motion detection sensor.

In accordance with a first aspect of the invention, a video encoding unit includes a first data input arranged to receive a video stream with a plurality of image frames from a camera monitoring a scene, a second data input arranged to receive sensor data from a sensor unit detecting motion in a plurality of predetermined scene regions, and a processing unit arranged to generate an overlay representing the sensor data and add the overlay to the image frames in the video stream, wherein the overlay has a plurality of overlay regions representing the scene regions, wherein the overlay includes a graphical element in those overlay regions which represent scene regions in which the sensor data indicates that motion was detected by the sensor unit.

In this way sensor data can be included in a video stream in a very convenient manner. There is no need to provide any separate channel for the sensor data, and the video stream can be processed just as it would without the overlay. Regular video analytics algorithms can be used to retrieve the sensor data from the video stream at a later stage, and no separate hardware or software needs to be provided to send or receive sensor data.

The graphical element may take the form of an animated graphical element. The animated graphical element may include at least one of the following: a graphical element which moves inside the overlay region, such as by rotating or by shifting position, or a graphical element which alternates between different visual states, such as by changing shape, color or pattern. Using an animated element means that it will be easy to detect the graphical element by commonly available motion or object detection methods and thereby in a simple and convenient manner determine that the sensor unit detected motion in a specific scene region.

The processing unit may be arranged to add the overlay to the image frames by replacing pixel values in a portion of the image frames with pixels forming the graphical element, in other words, the overlay may easily be added using standard procedures for adding overlays.

In some cases the image frames may include a representation of the scene having a format leaving a portion of the image frames blank and the processing unit may then be arranged to add the overlay to the blank portion. This would give the advantage that no information from the camera is hidden by the overlay and that only the blank portions are affected. This is especially useful when the video stream is received from camera having a wide-angle or fish-eye lens, giving a circular representation of the scene with blank areas around.

As an alternative, the processing unit may be arranged to add the overlay to a separate section in the image frames and to create the separate section by any of the following: increasing a size of the image frames in the video stream by adding a separate section for the overlay in the frames, or reducing the size of image data in the image frames by recoding the image data and adding a separate section for the overlay in the frames. In this way no information in the video from the camera is lost when adding the overlay, which is useful when there is no suitable area in the camera images to add an overlay without covering important information.

According to another aspect of the invention, a camera unit includes a camera arranged to monitor a scene, a sensor unit arranged to detect motion in a plurality of predetermined scene regions, and a video encoding unit as described above. The sensor unit may include an array of PIR sensors, wherein each PIR sensor is arranged to detect motion by sensing any changes in heat radiation in a respective one of the scene regions. PIR sensors provide a cost effective and robust way of detecting motion In addition, the amount of data to be fed to and processed by the video encoder takes up very little bandwidth and processing power.

Additionally, or as an alternative, the sensor unit may include a fix or rotating LIDAR sensor arranged to detect motion by sensing any changes of distance to objects in the scene regions. A LIDAR sensor gives a more detailed representation of the scene than a PIR array and the video encoding unit may therefore make additional analysis or filtering of the LIDAR data before generating the resulting overlay. E.g. the size of the object causing the motion or the extent of the motion may be used to filter out for which motions the graphical element should be added to the overlay.

Additionally, or as an alternative, the sensor unit may include an array of ultrasonic sensors arranged to detect motion by sensing any changes of distance to objects in the scene regions. Ultrasonic sensors, just as PIR sensors, are a cost effective option.

Additionally, or as an alternative, the sensor unit may include a time-of-flight, TOF, sensor arranged to detect motion by sensing any changes of distance to objects in the scene regions.

Additionally, or as an alternative, the sensor unit may include a structured light sensor arranged to detect motion by sensing any changes of distance to objects in the scene regions. Just as the LIDAR sensor, both the TOF sensor and the structured light sensor give a more detailed representation of the scene than a PIR array and the video encoding unit may therefore make additional analysis or filtering of the sensor data before generating the resulting overlay. E.g. the size of the object causing the motion or the extent of the motion may be used to filter out for which motions the graphical element should be added to the overlay.

Additionally, or as an alternative, the sensor unit may include an array of microphones arranged to detect motion by sensing any changes of sounds from objects in the scene regions. As an example certain types of sounds may be recognized, such as footsteps. The sound data may be used for other types of analysis as well, not only to detect motion.

According to another aspect of the invention, a video management system includes a third data input arranged to receive a video stream with a plurality of image frames depicting a scene having a plurality of predetermined scene regions, and an overlay with overlay regions representing the scene regions, and a video analytics unit arranged to analyze the video stream and to generate an event when an object is detected in a scene region and a graphical element is detected at the same time in an overlay region representing that scene region.

In this way it is possible for the video management system to utilize other data than pure video data in a convenient and simple manner, without needing to accommodate for a specific sensor data channel. Combining the detection in the overlay regions with the detection in the scene regions lowers the risk of false alarms, such as when shadows are detected as objects in the video. The detection in the overlay region may therefore be seen as a verification of the detection in the video image of the scene.

The video analytics unit may be arranged to detect objects in the scene regions by at least one of: detecting change or motion in the scene regions, such as by comparison of a current image frame to one or more previous image frames or a background model, or detecting presence of object by detecting object features of a specific object type, such as a face, a human, a vehicle, a license plate. Similar procedures may be used for the overlay regions, or more specifically the video analytics unit may be arranged to detect graphical elements in the overlay regions by at least one of: detecting change or motion of the graphical element such as by comparison of a current image frame to one or more previous image frames or a background model, or detecting presence of the graphical element by detecting specific object features.

According to another aspect of the invention, a video monitoring system includes the camera unit described above, the camera unit further arranged to output the video stream generated by the processing unit, and the video management system also described above and arranged to receive the generated video stream. Hereby a system is achieved where video data may easily be combined with sensor data from a motion sensor, without having to add any specific channels to provide the sensor data to the video management system. Standard video analytics procedures may then be used to retrieve the sensor data and combine it with detection in the video stream to achieve a better object detection, which in turn would give rise to fewer false alarms.

According to another aspect of the invention, a method of generating an encoded video stream includes the steps of receiving a video stream with a plurality of image frames from a camera monitoring a scene, receiving sensor data from a sensor unit detecting motion in a plurality of predetermined scene regions, and generating an overlay representing the sensor data and adding the overlay to the image frames in the video stream, wherein the overlay has a plurality of an overlay regions representing the scene regions, and wherein the overlay includes a graphical element in those overlay regions which represent scene regions where the sensor data indicates that motion was detected by the sensor unit.

According to another aspect of the invention, a method of generating video analytics events includes the steps of receiving a video stream with a plurality of image frames depicting a monitored scene having a plurality of predetermined scene regions, and an overlay with overlay regions representing the scene regions, analyzing the video stream and generating an event when an object is detected in a scene region and a graphical element is detected at the same time in an overlay region representing that scene region.

According to another aspect of the invention, a video monitoring method includes the steps of generating an encoded video stream according to the method described above and receiving the encoded video stream and generating video analytics events according to the method described above.

The method related aspects of the invention are associated with the same advantages as the above described device and system aspects of the invention.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will now be described in more detail by way of example and with reference to the accompanying schematic drawings, in which:

FIG. 4-9 show various examples of camera units.

DETAILED DESCRIPTION OF EMBODIMENTS

Figure 1:
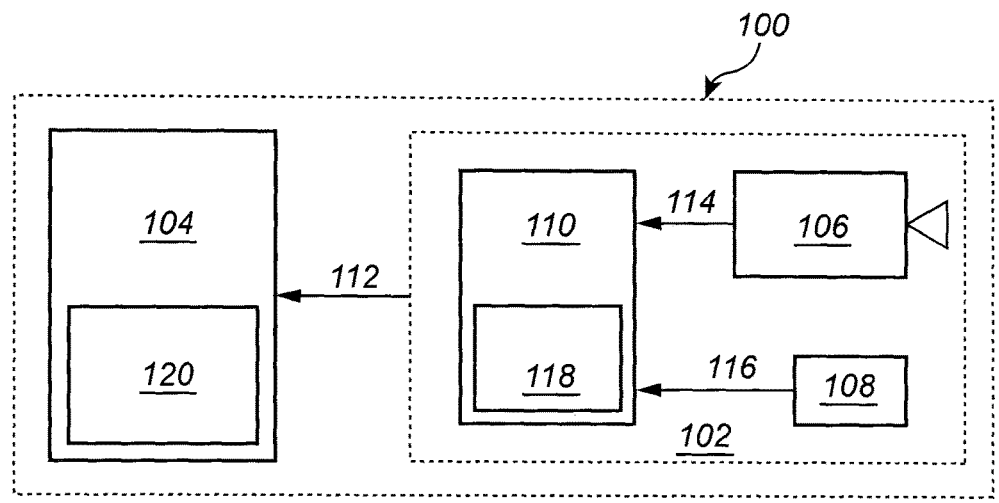
FIG. 1 illustrates a video monitoring system.

FIG. 1 shows a video monitoring system 100 containing a camera unit 102 and a video management system, VMS, 104. The camera unit 102 contains a camera 106, a sensor unit 108 and a video encoding unit 110. The video encoding unit 110 has a first input 114 which receives video images from the camera 106, and a second input 116 which receives sensor data from the sensor unit 108. The video encoding unit 110 also contains a processing unit 118. The camera unit 102 delivers a video stream to the video management system 104, directly or via a network. The video management system 104 receives the video stream from the camera unit via a third data input 112. The video management system 104 contains a video analytics unit 120.

Figure 2:
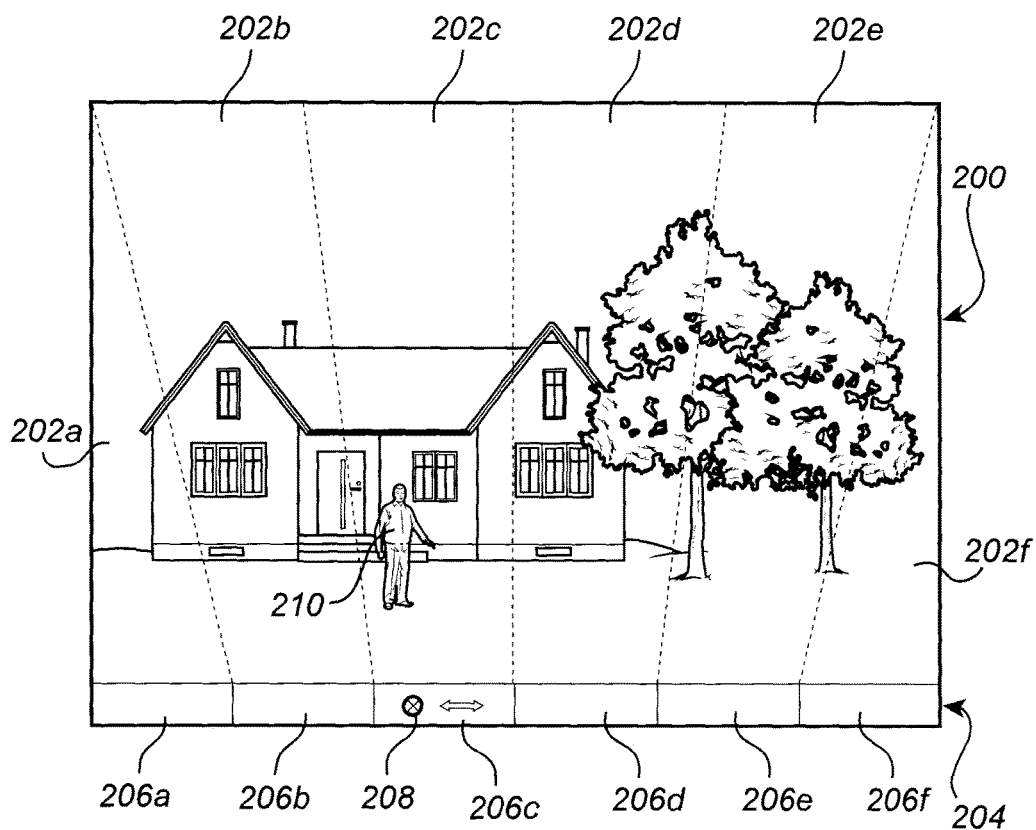
FIG. 2 shows an image frame.

The camera 106 monitors a scene 200, illustrated in FIG. 2, by capturing video images thereof. The sensor unit 108 also monitors the scene 200, by detecting motion in any of a plurality of scene regions 202a-f. The sensor unit 108 has a resolution according to the scene regions 202a-f, or greater, meaning that it is possible for the sensor unit 108 to at least detect in which of the scene regions 202a-f motion is taking place, or in other words, whether a motion is taking place in the scene region 202a, the scene region 202b, the scene region 202c, etc.

There are several possible different choices of sensors to use in the sensor unit 108. Some examples of a camera unit 102 including the camera 106 and the sensor unit 108 are illustrated in FIGS. 4-9. Any one of the illustrated examples of camera units may include any type of the described or other sensor units, and the below suggested combinations of sensor units and illustrated camera units are merely examples.

As a first example, an array of PIR sensors may be used in the sensor unit. Each of the PIR sensors may detect motion by sensing a change in heat in a respective scene region. Typically, each PIR sensor in the array would be set up to detect motion in only one of the scene regions 202a-f. The change in heat in a scene region is interpreted to mean that a human or other object having a temperature different to their environment, such as a vehicle or an animal, has moved in that region. Hence, when the sensor unit is an array of PIR sensors, the motion that can be detected in the scene by the sensor unit 108 will need to be associated to such a change in heat. A variant of a PIR sensor array could be a thermographic camera, typically with low resolution.

Figures 4, 5:
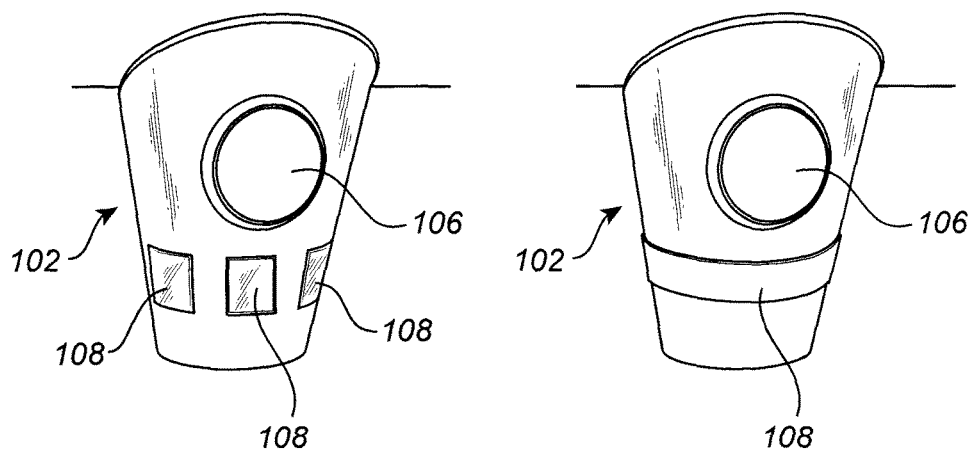

The array of PIR sensors may e.g. be used in a camera unit 102, as shown in FIG. 4 or FIG. 6. In FIG. 4, the camera unit is arranged to be placed high up on a wall, next to a ceiling, and the array of sensors in the sensor unit are placed below and next to the camera 106. This camera unit would be a convenient choice when monitoring a room or a corridor. In FIG. 6, a camera unit which is adapted to be mounted on or in a ceiling is shown. The sensors in the sensor unit 108 are placed around the camera 106. The camera may in this case have a wide-angle or fish-eye lens which is able to give an overview of a fairly large area.

Another choice of sensor unit 108 is a fix or rotating LIDAR sensor, which measures distance by illuminating the scene with a fix or rotating laser illuminator and analyzing the reflected light to find any changes in distance in the scene region. A detected change in distance in any of the scene regions is in turn interpreted to mean that an object has moved in that scene region.

The fix or rotating LIDAR sensor may e.g. be placed in a camera unit as shown in FIG. 5 or 9. The camera unit shown in FIG. 5 is similar to the camera unit shown in FIG. 4, but with a different type of sensor unit. The camera unit shown in FIG. 9 may be placed on a shelf high up on a wall, to monitor an area such as the inside of a convenience store.

Yet another choice of sensor unit 108 would be an array of ultrasonic sensors which measure distance by interpreting echoes from emitted high frequency sound waves. A detected change in distance in any of the scene regions is again interpreted to mean that an object has moved in that scene region. The array of ultrasonic sensors may e.g. be placed in a camera unit as shown in FIG. 7. The camera in FIG. 7 may, just as the camera illustrated in FIG. 6, be equipped with a wide-angle or fish-eye lens.

The sensor unit 108 may also contain Time of Flight, TOF, sensor which measure distance by measuring the time required for emitted light to reach an object and return to the camera. When there is a change in distance to any of the scene regions this means that an object has moved in that scene region.

The sensor unit 108 may also contain a structured light sensor which measures distance by projecting a known pattern of light onto the scene and analyzing the way this pattern is deformed. The movement of an object in a scene region is detected as a change in the deformation of the pattern.

The TOF sensor or the structured light sensor may e.g. be placed in a camera unit as shown in FIG. 8. The sensor unit 108 and the camera 106 are here two separate units that together form the camera unit 102. The sensor unit 108 in FIG. 8 is mounted onto a box-type camera 106, which e.g. may be used to monitor an outdoor scene, such as a parking lot.

According to another variant the sensor unit 108 may contain an array of microphones which detects movement by analyzing sounds originating from the scene regions. A sound which is determined to move in relation to the microphone array is an indication of movement in the scene. Another option would be to detect sounds that conform to a certain sound patterns, such as from footsteps. The array of microphones may e.g. be placed in a camera unit as illustrated in FIG. 7.

Going back to FIG. 1, the video encoding unit 110 receives a video stream from the camera 106 monitoring the scene 200, and sensor data from the sensor unit 108. The video encoding unit 118 creates an overlay 204 visualizing the sensor data, and adds this overlay to the video stream from the camera 106. As shown in FIG. 2, the overlay 204 contains a number of overlay regions 206a-f which each represents a corresponding scene region 202a-f. The dotted lines marking the scene regions 202a-f and the overlay regions 206a-f in FIG. 2 (and FIG. 3) are not necessarily present in the image in reality. In those scene regions where the sensor data indicates that motion was detected, the corresponding overlay region contains a graphical element 208.

In the example shown in FIG. 2, the sensor data indicates that motion is detected in the video from an object 210 in the scene region 202c, and therefore the overlay region 206c includes the graphical element 208. The graphical element 208 may take different forms; generally it will be a specific graphical symbol or an animated element. The animated element may e.g. be a graphical element or symbol which moves in the overlay region, such as by rotating or by shifting its position within the overlay region, e.g. by moving back and forth as indicated in FIG. 2.

The animated graphical element may also be a graphical element which alternates between two or more different visual states, such as by changing its color, pattern or even shape. The graphical element may e.g. shift between black and white, or alternate between two different shapes such as a circle and a square. Another option is to let the entire overlay region alternate between two visual states to create a "blinking" of the region. Another option would be to use a text as the graphical element, optionally moving or rolling, that e.g. says "motion detected by PIR sensor" or similar. The characteristics of the graphical element may be chosen depending on the capabilities of the video analytics unit at the video management system, i.e. what types of motion or object detection procedures that are available.

In FIG. 2, the graphical element is a circle or ball which moves back and forth, as indicated by the arrow, in the overlay region. The overlay 204 is placed in the bottom part of the image in the example shown in FIG. 2. It could also be placed at a side or at the top of the image frame. The overlay 204 can be placed on top of the image data, or in other words, image pixel data may be changed to pixel data for the overlay 204 in an area of the image. The area to place the overlay 204 would preferably be one where no important information is expected in the image. This would usually mean at the bottom or at the top of the frame. It would likely be most convenient for the user if the overlay is placed near one or more of the borders of the image, but this is not a requisite.

Figure 3:
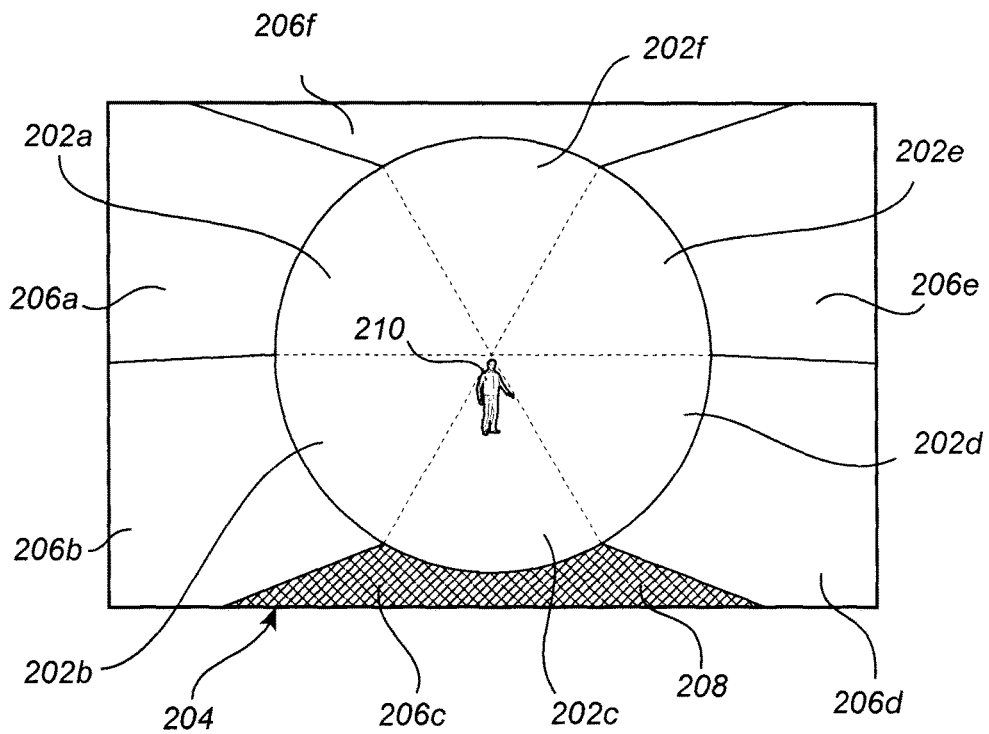
FIG. 3 shows another image frame.

In FIG. 3, a variant is shown where image data from the camera 106 does not take up the entire image frame. This would be the case for a camera 106 equipped with a wide-angle or fish-eye lens. As illustrated there is room for the overlay 204 around the circular representation of the scene, and the overlay regions 206a-f are placed next to a respective sector shaped scene region 202a-f. In the example shown in FIG. 3, the graphical element 208 indicating that motion from the object 210 is sensed in the scene region 202c is simply a filled overlay region 206c, which optionally could flash or blink, i.e. alternate between two colors.

Another option for the placement of the overlay 204 is to manipulate the video stream to create a place for the overlay 204 which is not on top of any image data from the camera 106. This could e.g. be accomplished by changing the size of the video, such as by adding a few rows of pixels at the bottom of the image which are used for the overlay 204. Another option would be to recode the image from the camera 106 to a smaller size, and then use the pixels which are no longer used for image data to display the overlay 204.

In whatever way the overlay 204 is placed in the image frames, the result may be described as a video stream which represents the scene 200 in two different ways in every frame; the video image from the camera 106 and the overlay 204 providing a visualization of movement in the scene 200 as sensed by the sensor unit 108 at the same time.

The video stream is sent to the VMS 104, where it is analyzed by the video analytics unit 112. The video analytics unit 112 may perform any type of video motion detection or object detection, e.g. by comparing an image frame with one or more previous frames, or by comparing an image frame to a background model. The video analytics unit 112 may detect objects by recognizing various object features, e.g. by using a cascade of object classifiers within a Viola-Jones type detection framework, such as is described in the article by P. Viola and M. Jones "Rapid object detection using a boosted cascade of simple features", in proceeding of IEEE Computer Society Conference on Computer Vision and Pattern Recognition, 2001.

The video analytics unit 112 is advantageously set up to detect motion, change or objects both within the actual video image and within the overlay 204 and to correlate a detection in a certain scene region 202a-f with a detection in the corresponding overlay region 206a-f such that an event is produced when there is a detection in both of the scene region and the corresponding overlay region. This is especially advantageous in a situation where there is a wish to supplement a monitoring camera with an external motion sensor and the camera is connected to a VMS which does not have the ability to receive any other data than video streams. Since the sensor data is represented as an overlay in the image frames of the video stream received by the VMS, there is no need to provide a separate stream of sensor data from the sensor unit to the video management stream. The VMS instead may use standard object or motion detection methods to extract this information from the overlay and combine it with information extracted from an analysis of the video image itself.

Figure 10:
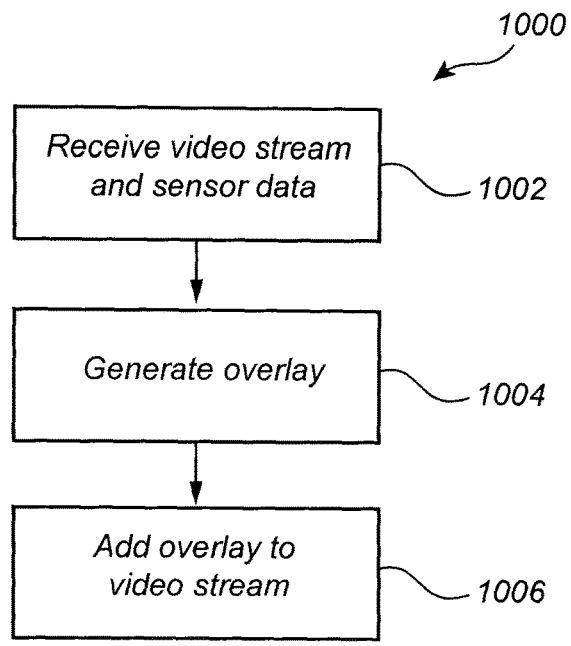
FIG. 10 illustrates a method of generating an encoded video stream.

In FIG. 10, a method 1000 of generating an encoded video stream is illustrated. In step 1002 a video stream is received from a camera and sensor data is received from a sensor unit. In step 1004 an overlay is generated from the sensor data indicating in which regions of a scene motion was detected by the sensor unit, and in step 1006 the overlay is then added to the video stream to generate the encoded video stream.

Figure 11:
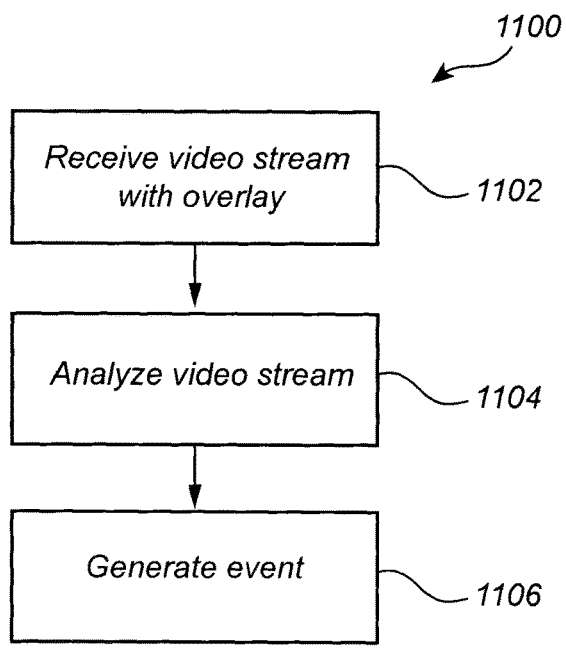
FIG. 11 illustrates a method of generating video analytics events.

In FIG. 11, a method 1100 of generating video analytics events is illustrated. In step 1102 the encoded video stream generated in step 1006 of the method 1000 is received. In step 1104 this encoded video stream is analyzed using standard video analytics procedures to detect motion and/or objects in both the scene regions and the overlay region. In step 1106 an event is then generated when detection is made both in a scene region and in a corresponding overlay region.

To summarize, herein is described methods and systems for including sensor data from a sensor unit 108 as an overlay 204 in a video stream from a camera 106 monitoring a scene 200. The overlay has overlay regions 206a-f corresponding to scene regions 202a-f, and when the sensor unit detects motion in a scene region a graphical element 208 is added to the overlay in the overlay region corresponding to that scene region. Video analytics procedures, such as object feature detection or motion or change detection may then be used to determine if detection has been made in a specific scene region by both the camera and the sensor unit.

Several variations of the described embodiments are possible. As an example, the video management system and the camera unit may be arranged within one unit, or may reside at different nodes in a network. The tasks of the video analytics unit and the video encoding unit may be performed by one and the same processing unit or in different processing units.

Another variation of the described embodiments would be to also add an overlay for motion or objects detected in the video from the camera. In this case the video could be analyzed at the camera unit and the video encoding unit would then add another overlay describing the detection in the video. This could be useful for visualizing motion or object detection made by the camera. A VMS may choose to detect motion in one of or both of the "camera motion detection" overlay and the video image of the scene. It would also be possible to add information from several sensor units in different overlay regions, or even to use different graphical symbols in the same overlay regions for detections made by different sensor units or the camera itself.

LIST OF REFERENCE NUMERALS

100 Video monitoring system
102 Camera unit
104 Video management system
106 Camera 108 Sensor unit
110 Video encoding unit
112 Data input for encoded video stream
114 Data input for video stream from camera
116 Data input for sensor data
118 Processing unit
120 Video analytics unit
200 Scene
202a-f Scene regions
204 Overlay
206a-f Overlay regions
208 Graphical element

The invention claimed is:

1. A video monitoring system comprising:
a camera unit comprising
a camera arranged to monitor a scene,
a motion sensor configured to detect motion in a plurality of predetermined scene regions, and
a video encoder comprising
a first data input configured to receive a video stream with a plurality of image frames from the camera,
a second data input configured to receive sensor data from the motion sensor, and
a processing circuit configured to generate an overlay representing the sensor data and add the overlay to the image frames in the video stream to generate an encoded video stream which represents the scene in two different ways in every image frame, wherein the overlay has a plurality of overlay regions each representing a corresponding scene region, wherein the overlay includes a graphical element in those overlay regions which represent scene regions in which the sensor data indicates that motion was detected by the motion sensor,
wherein the camera is configured to output the encoded video stream generated by the processing circuit; and
a video management system comprising
a third data input configured to receive the encoded video stream from the camera unit, and
a video analytics circuit configured to analyze the encoded video stream and to generate an event when an object is detected in a scene region and a graphical element is detected at the same time in an overlay region representing that scene region.

2. The video monitoring system of claim 1, wherein the graphical element is an animated graphical element.

3. The video monitoring system of claim 2, wherein the animated graphical element includes at least one of the following:
a graphical element which moves inside the overlay region, such as by rotating or by shifting position,
a graphical element which alternates between different visual states, such as by changing shape, color or pattern.

4. The video monitoring system of claim 1, wherein the processing circuit is configured to add the overlay to the image frames by replacing pixel values in a portion of the image frames with pixels forming the graphical element.

5. The video monitoring system of claim 1, wherein the image frames include a representation of the scene having a format leaving a portion of the image frames blank and wherein the processing circuit is configured to add the overlay to the blank portion.

6. The video monitoring system of claim 1, wherein the processing circuit is configured to add the overlay to a separate section in the image frames and to create the separate section by any of the following:
increasing a size of the image frames in the video stream by adding a separate section for the overlay in the frames,
reducing the size of image data in the image frames by recoding the image data and adding a separate section for the overlay in the frames.

7. The video monitoring system of claim 1, wherein the motion sensor includes at least one of the following:
an array of passive infrared (PIR) sensors, wherein each PIR sensor is arranged to detect motion by sensing any changes in heat radiation in a respective one of the scene regions,
a fix or rotating lidar sensor arranged to detect motion by sensing any changes of distance to objects in the scene regions,
an array of ultrasonic sensors arranged to detect motion by sensing any changes of distance to objects in the scene regions,
a time-of-flight sensor arranged to detect motion by sensing any changes of distance to objects in the scene regions,
a structured light sensor arranged to detect motion by sensing any changes of distance to objects in the scene regions,
an array of microphones arranged to detect motion by sensing any changes of sounds from objects in the scene regions.

8. The video monitoring system of claim 1, wherein the video analytics circuit is configured to detect objects in the scene regions by at least one of:
detecting change or motion in the scene regions, such as by comparison of a current image frame to one or more previous image frames or a background model,
detecting presence of object by detecting object features of a specific object type, such as a face, a human, a vehicle, a license plate.

9. The video monitoring system of claim 1, wherein the video analytics circuit is configured to detect graphical elements in the overlay regions by at least one of:
detecting change or motion of the graphical element such as by comparison of a current image frame to one or more previous image frames or a background model,
detecting presence of the graphical element by detecting specific object features.

10. A video monitoring method, including the steps of
generating an encoded video stream, comprising
receiving a video stream with a plurality of image frames from a camera monitoring a scene,
receiving sensor data from a motion sensor detecting motion in a plurality of predetermined scene regions,
generating an overlay representing the sensor data and adding the overlay to a predetermined portion of the image frames in the video stream, wherein the overlay has a plurality of overlay regions representing the scene regions, and wherein the overlay includes a graphical element in those overlay regions which represented scene regions where the sensor data indicates that motion was detected by the motion sensor;

receiving the encoded video stream; and generating video analytics events by analyzing the encoded video stream and generating an event when an object is detected in a scene region and a graphical element is detected at the same time in an overlay region representing that scene region.

\* \* \* \* \*